Feb. 28, 1961     N. K. HUBBARD ET AL     2,973,398
METHOD AND APPARATUS FOR MANUFACTURING BATTERY SEPARATORS
Filed Dec. 23, 1957
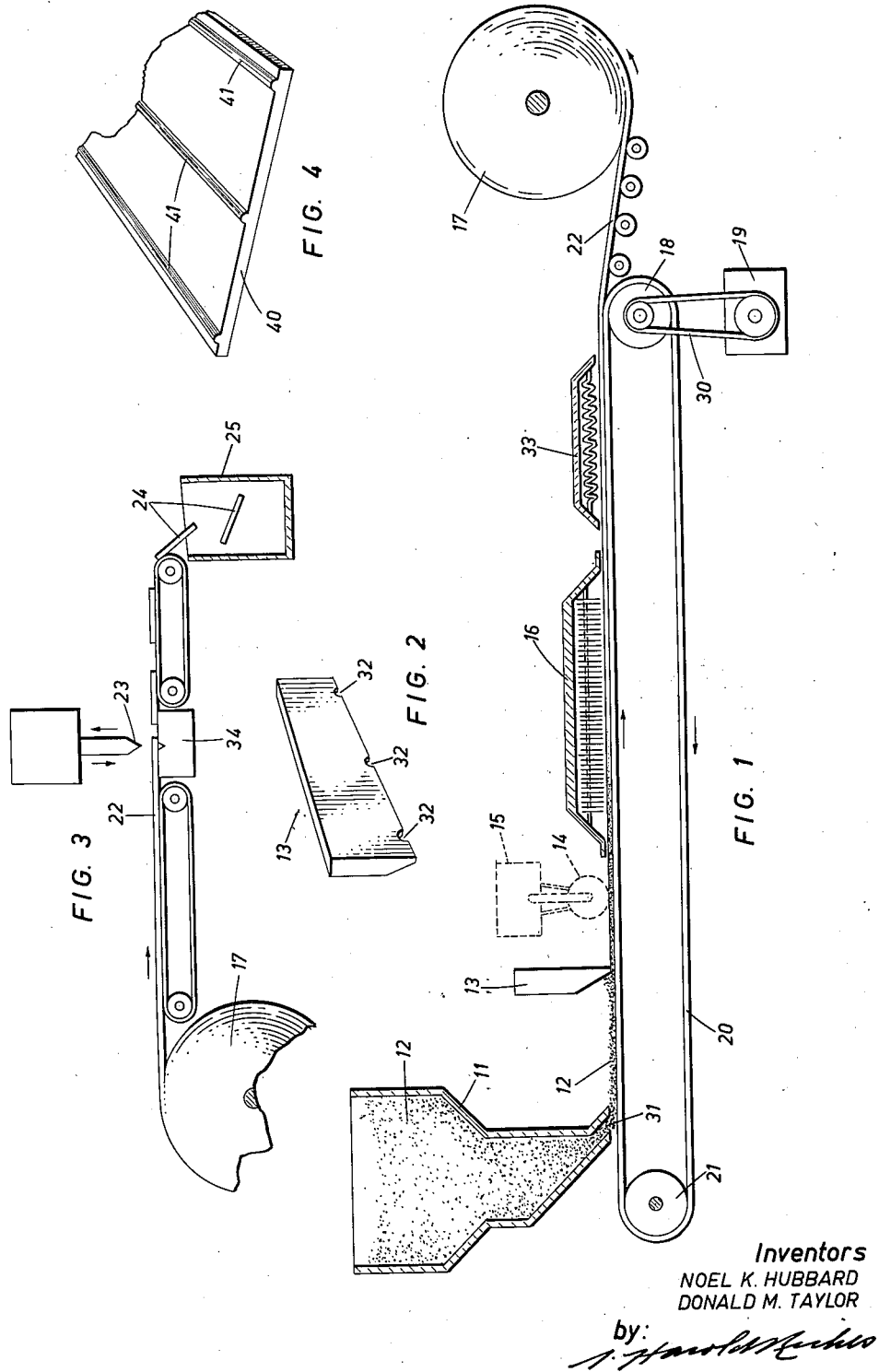
Inventors
NOEL K. HUBBARD
DONALD M. TAYLOR
by:

United States Patent Office 2,973,398
Patented Feb. 28, 1961

2,973,398

METHOD AND APPARATUS FOR MANUFACTURING BATTERY SEPARATORS

Noel Kirkpatrick Hubbard, Oakville, Ontario, Canada, and Donald Morey Taylor, Erindale, Ontario, Canada, assignors to Ohmics Limited, Toronto, Ontario, Canada, a company of Ontario Filed Dec. 23, 1957, Ser. No. 704,551

6 Claims. (Cl. 136—145)

This invention relates to the production of micro-porous sheets or plates. It is particularly directed to providing a method and apparatus for manufacturing battery separators.

Battery separators are used to separate the positive and negative plates of an electric storage battery and are required to meet relatively rigid and stringent requirements. They are very thin, of the order of about 0.030 inch or less in thickness and they must be strongly cohesive to resist, without disintegration, the stresses and strains to which they are subjected in manufacture, shipping, assembling into battery assemblies and in use. They must be sufficiently porous as to permit the free flow of positive and negative ions therethrough with a maximum ohmic resistance after 20 minutes immersion in acid or basic electrolyte of about 0.060 ohm per square inch and a maximum of about 0.050 ohm after 16 hours immersion. Battery failures usually are due to deterioration of the separators. The expected life of present battery separators formed of wood, paper and rubber compositions as used in low cost, mass produced batteries, is about two years in an automobile.

Extensive research has been conducted in many of the industrial countries of the world in an endeavor to discover an improved battery separator which has the desired physical and chemical properties necessary for use as a separator but which does not deteriorate under the conditions encountered in normal use. Battery separators formed of materials other than wood, paper or rubber compositions have not been entirely satisfactory. Either they do not meet the rigid physical and chemical requirements as outlined by the Society of Automotive Engineers or they are too costly for use in low cost, mass produced storage batteries.

Among the substitute compositions which have been investigated by others, are the vinyl, polyvinyl, styrene and polystyrene resins. Beads of from minus 20 to plus 80 mesh standard Tyler screen, from about 0.0328 inch to about 0.0069 inch in size, can be formed into thin, porous sheets when treated with a liquid softening agent or solvent and heated to their softening temperature with the application of at least slight pressure. A variety of other applications, using the above mentioned resins, have also been attempted, for example, extrusion techniques. Sheets of such compounds, however, have the important disadvantage that they are fragile and tend to disintegrate in handling and in use. That is, the particles are not sufficiently coherent as to form a thin, strong, tough micro-porous sheet or if they are made into thicker, self-supporting sheets they do not meet the physical standards of the Society of Automotive Engineers as desired by the industry. To date, attempts to overcome this problem of fragility and still retain desired physical characteristics of such sheets have not been successful.

We have found that micro-porous sheets of desired thickness, coherency, and stiffness and which have the physical and chemical characteristics desired in battery separators can be produced from finely divided particles of a compound of the group consisting of polymers and co-polymers of unsaturated hydrocarbons, fluocarbons, polyamides and acrylic esters which are chemically stable at temperatures below about 212° F. and which are resistant to attack by mineral acids and alkalies. These resins have the important advantage that they can be ground to a relatively fine particle size, of the order of less than about 0.020 inch, minus 26 mesh standard Tyler screen, without difficulty. These particles can be fused together at their surfaces into a micro-porous sheet of desired thickness by the application of heat without pressure. Micro-porous sheets can be made from these compounds of varying thickness which may be as thin as 0.001 inch to several feet, depending upon the thickness desired. Additionally, such separators do not deteriorate in normal use and definitely prolong the useful life of the battery.

Battery separators of suitable web thickness, from about 0.01 to about 0.05 inch can be produced in accordance with the present invention. They are strong and highly coherent to the extent that they can be handled, shipped and assembled into batteries by conventional procedures without danger of breaking or disintegrating. They are flexible to the extent that they can be made in a continuous sheet and wound on rolls for storage and shipping purposes. Also, they have the desired physical characteristics required of battery separators. They are porous to the extent that ions can migrate freely from one plate to the other as the battery is charged and discharged while the passage of solids is effectively prevented. They have a low ohmic resistance, less than 0.060 ohm per square inch, and are chemically stable below 212° F. Also, they are resistant to attack by the acid and alkali electrolytes conventionally used in storage batteries.

The micro-porous sheets of the present invention are amenable to low cost mass production. While the present invention is independent of any particular method of manufacture, a preferred method is to distribute particles of one or a mixture of the defined compounds as a bed or layer on a suitable non-adherent plane surface. These particles can be of relatively uniform or of random sizes but should be ground to a particle size of at least about 0.020 inch or less in any direction. The thickness of the bed of particles on the plane surface is determined by the thickness desired in the finished sheet. Usually, there is minor shrinkage in thickness as the sheet is cooled from its formation temperature to atmospheric temperature and this can be readily calculated. The layer of particles of uniform thickness is then heated substantially uniformly throughout, such as by electrical conduction heating, to a temperature at which there is incipient fusion of the particles without appreciable deformation. That is, the bed of particles is heated uniformly to a temperature at which there is fusion or incipient fusion of the surfaces but with little or no deformation of the individual particles which would tend to close the minute interstices or pores between the perimeter surfaces of adjacent particles. In this way, the surfaces of the particles fuse together to form a sheet or film, and the minute interstices between perimeter surfaces of adjacent particles form the pores which are necessary for the free, unrestricted migration of ions between the opposing positive and negative plates of the assembled battery. This heating step is conducted without the application of pressure which would tend to deform the particles and close the pores in the resulting sheet. The heating step is continued until the surfaces of the individual particles have fused together to form a sheet. The sheet is then cooled and is ready for cutting into the desired battery separators.

The following examples illustrate the production of battery separators from compounds of the present invention and the characteristics of the separators produced thereby.

A very satisfactory material from which battery separators of desired properties can be produced comprises essentially a linear polyethylene having a molecular weight of 50 thousand and higher. Particles of this material are of spheroidal or random shape and can be readily ground to the desired size range. Sheets of desired thickness formed of linear polyethylene particles are strongly coherent. They have ohmic resistance values of 0.060 ohm per square inch or less and are sufficiently porous as to permit the free flow of ions therethrough as the battery is being charged or discharged.

*Example 1*

Particles of linear polyethylene of random size less than about 0.020 inch in any direction, about minus 29 mesh standard Tyler screen were spread evenly in a uniform coating over the plane surface of a travelling belt conveyor by means of a straight or contoured patterned knife. The thin bed of particles was heated to a temperature of from about 500° F. to about 750° F. for a controlled period of time in order to produce incipient fusion or surface fusion of the particles without deformation. The heating time varied from a period of less than a minute at 750° F. to about two minutes at 500° F. for a coating thickness of 0.030 inch or less and proportionately more time for thicknesses greater than 0.030 inch. During this heat-time interval, the surfaces of the particles softened to the extent of surface fusion which caused adjacent and contacting particles to bond and fuse together into a strong, cohesive micro-porous sheet. The heating period was then terminated and the sheet was cooled to a temperature below the fusion temperature, for example, safely below about 150° F. and was retained at the lower temperatures until the sheet had cooled and the surfaces of the particles had hardened. The resultant micro-porous sheet was then cut to the desired size and was ready for use as a battery separator. The separator had an ohmic resistance factor of less than 0.060 ohm per square inch. The sheet also had excellent flexural strength and was resistant to corrosion in acid and in alkali electrolytes within the temperature range of from minus 60° F. and plus 240° F.

*Example 2*

Particles of polyvinylchloride resin of random size, less than about 0.020 inch in any direction, were distributed over the plane surface of a metal plate. The particles were distributed in the form of a thin bed of substantially uniform thickness by a knife. The bed of particles was heated to a temperature within the range of from about 500° F. to 750° F. for a period of time sufficient to effect incipient fusion of the surfaces of the particles without deformation of the particles. The time of heating was less than a minute at 750° F. to about 1.5 minutes at 500° F. for a coating thickness of 0.030 inch. At the end of heating period, the sheet was cooled to a temperature below the fusion temperature actually to atmospheric temperature, and was retained on the plane surface until it had cooled and the surfaces of the particles had hardened to the extent that the sheet could be removed from the surface without danger of breakage. The sheet was then cut into the desired size for use as a battery separator. It was slightly more fragil than sheets formed of linear polyethylene but it could be handled, transported and installed in batteries without danger of breakage. The sheet had an ohmic resistance factor of less than 0.050 ohm per square inch. They were flexible and coherent and were resistant to cororsion in alkali and acid electrolytes within the temperature range of from minus 32° F. to plus 180° F.

*Example 3*

A mixture comprised of 60 parts of linear polyethylene particles, 20 parts of polyvinylchloride particles, and 20 parts of polystyrene particles were thoroughly mixed to produce a substantially uniform mixture of the respective particles. The particles were of random size, less than about 0.020 inch in any direction. The particles were spread in the form of a sheet or web of substantially uniform thickness on a non-adherent plane surface of a belt conveyor. The particles were heated to a temperature within the range of from about 500° F. to 750° F. for about a minute at the higher temperature and about 2 minutes at the lower temperature in order to produce incipient fusion or surface softening of the particles without deformation. At the end of the heating period, the particles were cooled to a temperature below their fusion temperature and were retained on the belt until the sheet had cooled and the surfaces of the particles had hardened into a strong, coherent sheet. The resulting micro-porous sheet, when cut into battery plates, had an ohmic resistance factor of from 0.040 to 0.062 ohm per square inch. There was no degradation in the sheet or deterioration of its chemical or physical properties within the temperature range of 0° F. to 200° F. The separators were resistant to corrosion in acid and alkali electrolytes.

In this example, polystyrene particles were employed as a filler. Other fillers such as wood flour, finely divided wood cellulose and the like can be employed in small amounts without deterioration of desired chemical and physical properties.

A preferred form of apparatus for manufacturing the battery plates of the present invention is illustrated schematically in the accompanying drawing in which:

Figure 1 is a side elevation;

Figure 2 is a front view of a knife suitable for distributing the particles over a plane surface and for forming the desired pattern on the bed of particles;

Figure 3 is a schematic view of a sheet cutting device; and

Figure 4 is a plan view, in perspective, of a battery separator produced by the method and apparatus of this invention.

Like reference characters refer to like parts throughout the description and drawing.

The numeral 20 indicates an endless belt conveyor which is extended at one end over a driving roller 18 and at the other end over an idler roller 21. The roller 18 can be driven from a motor 19 through a belt 30.

A feed hopper 11 is positioned above the belt, preferably above the idler roller 21 and is provided with an outlet 31 which extends transversely of the belt. Provision can be made, if desired, to vibrate the hopper 11 according to conventional practice to ensure the free flow of particles across the desired width of the belt. The surface of the belt on which the particles are distributed is a plane surface and, preferably, is formed of or treated with a material to which the particles do not adhere during the operation of the process.

Particles 12 are distributed across the desired width of the belt and a loose layer or bed of individual particles is formed of desired thickness by a stationary leveling knife 13 which extends transversely of the belt. The knife 13 preferably is adjustable in a vertical plane to increase or decrease the distance between its lower edge and the belt, thus to permit careful adjustment of the thickness of the bed of particles 12. The lowermost edge of the knife 13 is formed with spaced, cut-out portions 32 as illustrated in Figure 2, at which points the layer of particles is somewhat thicker and form the stiffening ribs at the edge of the finished battery separators. Stiffening ribs for a sheet 0.03 inch thick normally would be of the order of from 0.05 to 0.07 inch thick and the channels 32 are designed to provide the increased thickness at these points. The cutting knife 13 can be designed to impart any desired number of stiffening ribs across the width of the sheet.

An alternative arrangement for embossing the sheet or bed of particles is shown in dotted lines of the parts 14 and 15. The numeral 14 indicates an embossing roll which can be mounted to ride without applied pressure on the surface of the sheet of bed. The embossing roll can be driven by a motor indicated by the numeral 15. The coating knife 13 and the embossing roller can be employed separately or in combination.

The numeral 16 indicates a heating zone through which the bed or sheet of particles 12 is advanced towards and to the discharge end of the conveyor. Provision is made, such as by induction heating or by coils, to produce and maintain, in the bed of particles, a temperature sufficiently high to cause incipient or surface fusion of individual particles as the sheet is advanced through the zone. Either or both the temperature maintained in the heating zone 16 and the speed of the belt can be adjusted to obtain the desired fusion of the surface of the particles without deformation of the shapes of the individual particles. The bed or layer of individual particles which enters the heating zone becomes, during its passage through this zone, a micro-porous sheet of individual particles firmly secured at their surface to adjacent particles.

On leaving the heating zone, the sheet is cooled to about atmospheric temperature. The rate of cooling can be increased by passing it through a cooling zone 33 in which refrigerating coils are provided. On cooling to atmospheric temperature, the sheet is strong and highly coherent and can be wound on a winding roll 17 for storage or shipment prior to cutting into the desired battery plates.

If desired, a die cutting unit, such as illustrated in Figure 3, can be substituted for the winding roll. The die cutting unit illustrated in Figure 3 comprises a knife 23 which is mounted above an anvil 34. The knife 23 is mounted for vertical movement at predetermined time intervals. The finished sheet 24 passed between the knife 23 and the anvil 34 and is cut into individual sheets of predetermined size which are discharged from the unit and collected ready for use or shipment.

A battery separator produced by the method of the present invention is illustrated by Figure 4. The separator comprises a web portion 40 which has a thickness of from 0.01 inch to 0.05 inch and stiffening ribs 41 which are about double the thickness of the web portion, that is they would have an overall thickness of from 0.02 inch to 0.06 inch. The specific dimensions, that is length, width and thickness, can be varied, of course, to meet the requirements of the battery in which they are to be used. The spacing between the positive and negative plates of the battery is determined by the height of the ribs above the web of the plates. The web thickness is determined by the strength, size, porosity and ohmic resistance factors and can be corelated to meet the requirements of each specific battery manufacturer.

What we claim as new and desire to protect by Letters Patent of the United States is:

1. A battery separator which comprises a self-supporting porous sheet formed of self-bonded particles of a compound selected from the group consisting of polymers and co-polymers of an unsaturated hydrocarbon, polyamides, acrylic esters and mixtures thereof which are chemically stable at temperatures below about 212° F., said sheet being in the form of individual particles of random sizes less than about 0.02 inch in any direction, each particle being self-bonded to contacting surfaces of adjacent particles without deformation of their original, individual shapes and being permeable to the passage of ions therethrough and having an ohmic resistance less than about 0.06 ohm per square inch.

2. A battery separator according to claim 1 in which the self-bonded particles are members of the group consisting of linear polyethylene, polyvinyl chloride and polystyrene.

3. A battery separator which comprises a self-supporting porous sheet formed of self-bonded particles of a compound selected from the group consisting of polymers and co-polymers of an unsaturated hydrocarbon, polyamides, acrylic esters and mixtures thereof which are chemically stable at temperatures below about 212° F., said sheet being in the form of individual particles of random sizes less than about 0.02 inch in any direction and having raised, spaced, parallel ribs of greater thickness than the areas between said ribs, each particle being self-bonded to contacting surfaces of adjacent particles without deformation of their original, individual shapes and being permeable to the passage of ions therethrough and having an ohmic resistance less than about 0.06 ohm per square inch.

4. The method of producing battery separators which comprises the steps of forming on a plane surface, a layer of predetermined thickness of unconnected particles of random sizes less than about 0.02 inch in any direction of a member selected from the group consisting of polymers and co-polymers of an unsaturated hydrocarbon, polyamides, acrylic esters, and mixtures thereof which are chemically stable at temperatures below about 212° F., heating said layer at a temperature not substantially higher than the softening temperature of said particles, continuing said heating to produce surface fusion of contacting surfaces of adjacent particles while maintaining their original, individual shapes with interstices between non-contacting surfaces, and cooling said layer to harden the bonds which join said particles.

5. The method of producing battery separators which comprises the steps of forming on a plane surface, a layer of predetermined thickness of unconnected particles of random sizes less than about 0.02 inch in any direction of a member selected from the group consisting of polymers and co-polymers of an unsaturated hydrocarbon, polyamides, acrylic esters, and mixtures thereof which are chemically stable at temperatures below about 212° F., forming spaced, parallel ridges on said layer of greater thickness than the areas between said ridges, heating said layer at a temperature not substantially higher than the softening temperature of said particles, continuing said heating to produce surface fusion of contacting surfaces of adjacent particles while maintaining their original, individual shapes with interstices between non-contacting surfaces, and cooling said layer to harden the bonds which join said particles.

6. The method of producing battery separators which comprises the steps of continuously forming on a plane surface a layer of predetermined thickness of unconnected particles of random sizes less than about 0.02 inch in any direction of a member selected from the group consisting of polymers and co-polymers of an unsaturated hydrocarbon, polyamides, acrylic esters, and mixtures thereof which are chemically stable at temperatures below about 212° F., levelling said layer to a predetermined thickness, forming spaced, parallel ridges on said layer of greater thickness than the areas between said ridges, heating said layer at a temperature not substantially higher than the softening temperature of said particles, continuing said heating to produce surface fusion of contacting surfaces of adjacent particles while maintaining their original, individual shapes with interstices between non-contacting surfaces, cooling said layer to harden the bonds which join said particles, and cutting said sheet into predetermined sizes.

References Cited in the file of this patent

UNITED STATES PATENTS

| | | |
|---|---|---|
| 2,542,527 | Honey et al. | Feb. 20, 1951 |
| 2,564,397 | Duddy | Aug. 14, 1951 |
| 2,662,929 | Dague | Dec. 15, 1953 |
| 2,794,753 | Duddy | June 4, 1957 |

FOREIGN PATENTS

| | | |
|---|---|---|
| 679,514 | Great Britain | Sept. 17, 1952 |